United States Patent
Xu et al.

(10) Patent No.: US 9,274,826 B2
(45) Date of Patent: Mar. 1, 2016

(54) METHODS FOR TASK SCHEDULING THROUGH LOCKING AND UNLOCKING AN INGRESS QUEUE AND A TASK QUEUE

(71) Applicant: Futurewei Technologies, Inc., Plano, TX (US)

(72) Inventors: Jun Xu, Cupertino, CA (US); Dong Wang, Santa Clara, CA (US); Guang Zhao, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 410 days.

(21) Appl. No.: 13/730,319

(22) Filed: Dec. 28, 2012

(65) Prior Publication Data
US 2014/0189695 A1    Jul. 3, 2014

(51) Int. Cl.
*G06F 9/46* (2006.01)
*G06F 9/48* (2006.01)
*H04L 12/54* (2013.01)

(52) U.S. Cl.
CPC ............... *G06F 9/46* (2013.01); *G06F 9/4881* (2013.01); *H04L 12/5693* (2013.01)

(58) Field of Classification Search
CPC ...... G06F 9/46; G06F 9/4881; H04L 12/5693
USPC .......... 718/100, 102, 103, 104, 105; 370/412, 370/395.1; 707/8, 999.008; 710/200
See application file for complete search history.

(56) References Cited

U.S. PATENT DOCUMENTS

| | | | |
|---|---|---|---|
| 5,970,049 A | 10/1999 | Borst et al. | |
| 6,016,305 A | 1/2000 | Borst et al. | |
| 6,665,495 B1 | 12/2003 | Miles et al. | |
| 6,728,959 B1 * | 4/2004 | Merkey | 718/102 |
| 7,286,531 B2 | 10/2007 | Qiao et al. | |
| 7,561,571 B1 | 7/2009 | Lovett et al. | |
| 7,656,887 B2 | 2/2010 | Okuno | |
| 7,664,110 B1 | 2/2010 | Lovett et al. | |
| 7,685,281 B1 | 3/2010 | Saraiya et al. | |

(Continued)

FOREIGN PATENT DOCUMENTS

| | | | |
|---|---|---|---|
| CN | 101436989 A | 5/2009 | |
| CN | 101616083 A | 12/2009 | |

(Continued)

OTHER PUBLICATIONS

Partial English Translation and Abstract of Chinese Patent Application No. CN101616083A, Jul. 8, 2014, 3 pages.

(Continued)

*Primary Examiner* — Meng An
*Assistant Examiner* — Abu Ghaffari
(74) *Attorney, Agent, or Firm* — Conley Rose, P.C.; Grant Rodolph; Richard J. Mason (57) ABSTRACT

A method for parallel processing implemented by a first core in a network unit, comprising locking an ingress queue if the ingress queue is not locked by another core, searching for an unlocked task queue from a first default subset of a plurality of task queues when the ingress queue is locked by another core, wherein the first subset is different from a second default subset of the plurality of task queues from which a second core begins a search for an unlocked task queue, and searching a remainder of the plurality of task queues for an unlocked task queue when all of the first default subset of task queues are locked and the ingress queue is locked.

10 Claims, 5 Drawing Sheets

(56) References Cited

U.S. PATENT DOCUMENTS

| | | |
|---|---|---|
| 7,843,906 B1 | 11/2010 | Chidambaram et al. |
| 7,843,907 B1 | 11/2010 | Abou-Emara et al. |
| 7,860,097 B1 | 12/2010 | Lovett et al. |
| 7,860,961 B1 | 12/2010 | Finkelstein et al. |
| 7,873,693 B1 | 1/2011 | Mehrotra et al. |
| 7,953,903 B1 | 5/2011 | Finkelstein et al. |
| 7,979,552 B1 | 7/2011 | Saraiya et al. |
| 7,990,994 B1 | 8/2011 | Yeh et al. |
| 8,145,785 B1 | 3/2012 | Finkelstein et al. |
| 8,194,690 B1 | 6/2012 | Steele et al. |
| 8,218,538 B1 | 7/2012 | Chidambaram et al. |
| 8,255,644 B2 | 8/2012 | Sonnier et al. |
| 8,301,749 B1 | 10/2012 | Finklestein et al. |
| 8,594,131 B1 * | 11/2013 | Gmuender et al. ............ 370/475 |
| 8,943,507 B2 * | 1/2015 | Mital et al. .................... 718/101 |
| 8,949,501 B1 * | 2/2015 | Akhter et al. ................. 710/315 |
| 2003/0195920 A1 | 10/2003 | Brenner et al. |
| 2005/0100017 A1 | 5/2005 | Williams, Jr. et al. |
| 2006/0056406 A1 * | 3/2006 | Bouchard et al. ............. 370/389 |
| 2010/0080559 A1 * | 4/2010 | Sarashina .......... H04Q 11/0067 398/67 |
| 2014/0019982 A1 * | 1/2014 | John ....................... G06F 9/544 718/102 |
| 2014/0181470 A1 * | 6/2014 | Finney et al. ................... 712/30 |

FOREIGN PATENT DOCUMENTS

| | | |
|---|---|---|
| CN | 102685001 A | 9/2012 |
| CN | 102685002 A | 9/2012 |

OTHER PUBLICATIONS

Partial English Translation and Abstract of Chinese Patent Application No. CN102685001A, Jul. 8, 2014, 2 pages.
Partial English Translation and Abstract of Chinese Patent Application No. CN102685002A, Jul. 8, 2014, 3 pages.
Foreign Communication From a Counterpart Application, PCT Application No. PCT/CN2013/090709, International Search Report dated Apr. 3, 2014, 6 pages.
Foreign Communication From a Counterpart Application, PCT Application No. PCT/CN2013/090709, Written Opinion dated Apr. 3, 2014, 4 pages.
Rangan, R., et al., "Amortizing Software Queue Overhead for Pipelined Inter-Thread Communication," Association for Computing Machinery, Sep. 2006, 5 pages.
Sundell, H., et al., "Fast and Lock-Free Concurrent Priority Queues for Multi-Thread Systems," Technical Report No. 2003-01, Department of Computer Science, vol. 65, No. 5, 2003, 15 pages.
Sutter, H., et al., "Maximize Locality Minimize Contention," Aug. 14, 2014, 4 pages.
Foreign Communication From A Counterpart Application, European Application No. 13869382.5, Extended European Search Report dated Nov. 12, 2015, 9 pages.

* cited by examiner

METHODS FOR TASK SCHEDULING THROUGH LOCKING AND UNLOCKING AN INGRESS QUEUE AND A TASK QUEUE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A multi-core processor is a single computing component (e.g., a central processing unit (CPU)) with two or more independent acting processing units or "cores." The cores are the components that read and execute software instructions, such as add, move data, etc. Multi-core processors can run or execute multiple instructions at the same time (i.e., parallel processing), thereby increasing the overall speed for applications executing on a computer. Multi-cores are typically integrated onto a single integrated circuit. Multi-core processors have been common in servers, desktop computers, and laptops for some time, but have only recently become utilized in routers, switches, and other network nodes responsible for routing data packets across the Internet. However, the requirements and objectives of routers and similar devices are different from servers and the like and present additional challenges for parallel processing.

SUMMARY

In one embodiment, the disclosure includes a method for parallel processing implemented by a first core in a network unit, comprising locking an ingress queue if the ingress queue is not locked by another core, searching for an unlocked task queue from a first subset of a plurality of task queues when the ingress queue is locked by another core, wherein the first subset is different from a second subset of the plurality of task queues from which a second core begins a search for an unlocked task queue, searching a remainder of the plurality of task queues for an unlocked task queue when all of the first default subset of task queues are locked and the ingress queue is locked.

In another embodiment, the disclosure includes a network unit for parallel processing, comprising a plurality of cores, a memory coupled to the plurality of cores, wherein the memory comprises a plurality of ingress queues, a plurality of task queues, and an order queue, wherein all the cores are allowed to access any of the ingress queues, the task queues, and the order queue, wherein the cores are configured such that when one or a subset of the cores locks the ingress queues, the other cores search for an unlocked task queue, wherein each core is associated with a subset of the task queues from which the search for the unlocked task queue begins, and wherein the subsets for at least two of the cores are different.

In another embodiment, the disclosure includes, in a network unit, a computer program product executable by a multi-core core, the computer program product comprising computer executable instructions stored on a non-transitory computer readable medium that when executed by the core cause the network unit to perform the following: lock with a first core an ingress queue if the ingress queue is not locked by another core, search with the other available first core for an unlocked task queue from a first default subset of a plurality of task queues when the ingress queue is locked by another core, wherein the first subset is different from a second default subset of the plurality of task queues from which a second core begins a search for an unlocked task queue, search with the first core a remainder of the plurality of task queues for an unlocked task queue when all of the first default subset of task queues are locked and the ingress queue is locked.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Modern CPUs may have between two and thirty-two cores in one CPU. However, industry is continually pushing for more cores on one CPU. With the industry adoption of the multi-core central processing units (CPUs), parallel processing is common in the server/computation market and is becoming common in routers/switches for packet scheduling and processing. However due to the possible large amount of memory sharing and cache-line issues, existing packet schedulers are either using a centralized model, are designed for a small number of cores (limited performance), or rely on hardware. Many existing parallel processing approaches focus on either a centralized model or a distributed model. Generally, the distributed model may scale with the number of processing units (e.g. CPUs/cores). However, order should be preserved for tasks, e.g. for packet, transaction processing. Due to Amdahl's law, enforcement of the order of task execution for parallel processing may be quite challenging, especially in the distributed model. Most, if not all, existing solutions cause serialization execution instead, and may result in low performance.

Figure 1:
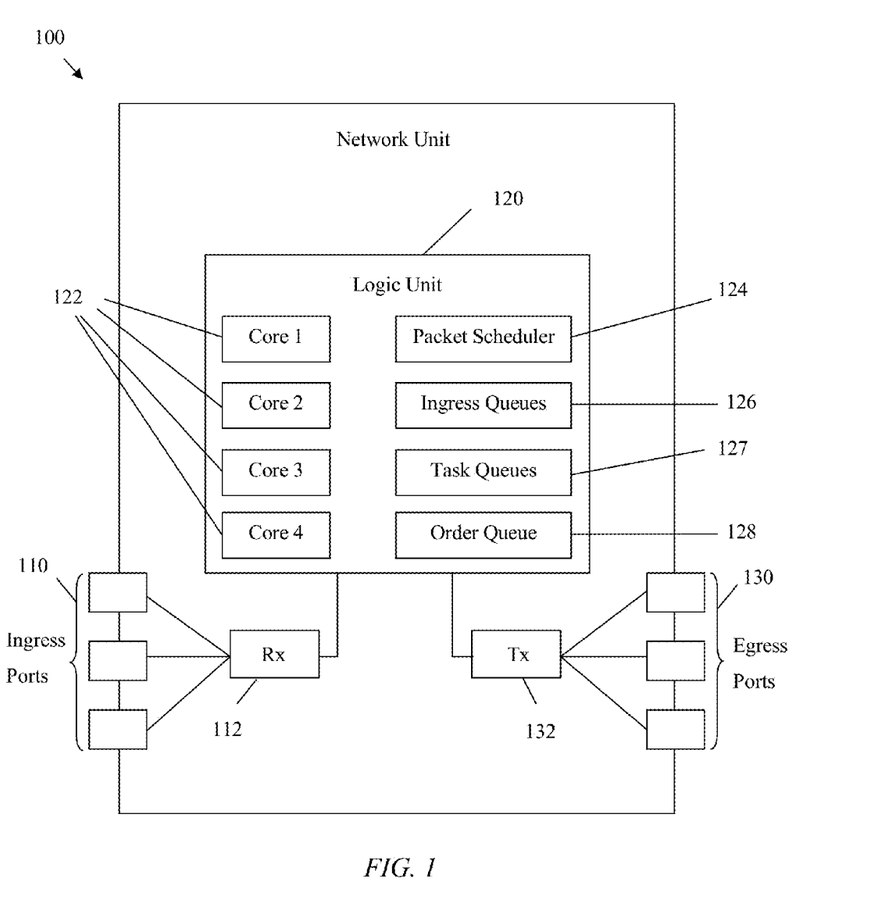
FIG. 1 is a schematic diagram illustrating a disclosed embodiment of a network unit, which may be any device that transports and processes data through the network.

Disclosed are methods, apparatuses, and systems to substantially evenly distribute tasks among processing units while preserving task orders and providing high performance (e.g., 15 Mega packets per second (Mpps)). The disclosed systems provide rules to instruct the processors on how to select a function to perform in order to avoid contention for resources between the cores and to substantially maximize the use of all of the cores in a data processing system. All of the cores may lock and poll tasks from an ingress queue, but only one of the cores may lock the ingress queue(s) at a given time. When the ingress queue is locked by one core, the other cores may transition to locking and polling one of a plurality of task queues. Any of the cores may lock and poll any of the task queues. However, each core may be assigned a different subset of the task queues to begin a search for an unlocked task queue. This may reduce contention between the cores. Although contention may still occur, the contention between the cores may be at a much lower and controllable rate than provided by other methods. If all of the task queues in a cores' designated subset of task queues are locked by other cores, the core may attempt to find an unlocked task queue from the remaining task queues, thereby ensuring that a core does not remain idle and providing substantial optimization of processing resources. If all of the task queues are locked, which may be very rare, if even possible, a core may repeat the same ingress queue/task queues check again FIG. 1 illustrates an embodiment of a network unit 100, which may be any device that transports and processes data through the network. The network unit 100 may comprise one or more ingress ports or units 110 coupled to a receiver (Rx) 112 for receiving signals and frames/data from other network components. The network unit 100 may comprise a logic unit 120 to determine which network components to send data to. The logic unit 120 may be implemented using hardware, software, or both. The logic unit 120 may comprise a plurality of central processing units (CPUs) or cores 122 (which may also be referred to herein as "processor(s)"). The cores 122 may comprise separate chips or may comprise a single chip with multiple cores. The logic unit 120 may also comprise a packet scheduler 124, ingress queues 126, task queues 127, and order queues 128. The packet scheduler 124 may be implemented using hardware, software, or both. The packet scheduler 124 may be dynamically changed to change the manner in which the cores 122 access the ingress queues 126, task queues 127, and the order queue 128 to reduce contention among the cores 122. Contention among the cores 122 arises when two are more cores 124 attempt to lock/update the same data structure. Contention among the cores 122 may significantly reduce the performance of the network unit 100. The ingress queues 126 may comprise a plurality of ingress packets. The task queues 127 may comprise a plurality of task queues with each task queue corresponding to zero to multiple different tasks. The order queue 128 may comprise tasks that may be processed in the order that they appear in the order queue 128. Each of the ingress queues 126, each of the task queues 127, and the order queue 128 may comprise a First-In-First-Out (FIFO) data structure in a memory or data storage. The network unit 100 may also comprise one or more egress ports or units 130 coupled to a transmitter (Tx) 132 for transmitting signals, data packets, and frames/data to the other network components. The components of the network unit 100 may be arranged as shown in FIG. 1 or may be otherwise configured in other embodiments.

The packet scheduler 124 may provide packets to the cores 124 for parsing, look up, feature processing, and sending to an egress path. The packet scheduler 124 may provide pre-processed packets to the cores 122. In an embodiment, the packet scheduler may provide the packets to the cores 122 when the cores 122 are available. The packet scheduler 124 may be composed of one or all the available cores 122 and may comprise a scheduler function that may be executed by one or more of the available cores 122. Each core executing the scheduler function may determine whether to poll the ingress queues 126, whether to pull a task from one of the task queues 127 and place the task into the order queues 128 to process the task, or order enforce to remove the task that it is at the head of the order queue 128. Each core 122 may specify a subset of the task queues 128 from which to begin a search for an unlocked task queue. If contention between the cores 122 becomes an issue or exceeds a threshold value, the members of each subset of the task queues 128 and or the assignment of the subsets of the task queues 128 to the cores 122 may be dynamically changed in order to reduce contention between the cores 122. For example, the threshold value may be a maximum time that a core 122 may be idle or may be a maximum number of tries that a core 122 may fail to achieve a lock on the task queues 128 due to the task queues 128 being locked by another core 122.

Figure 2:
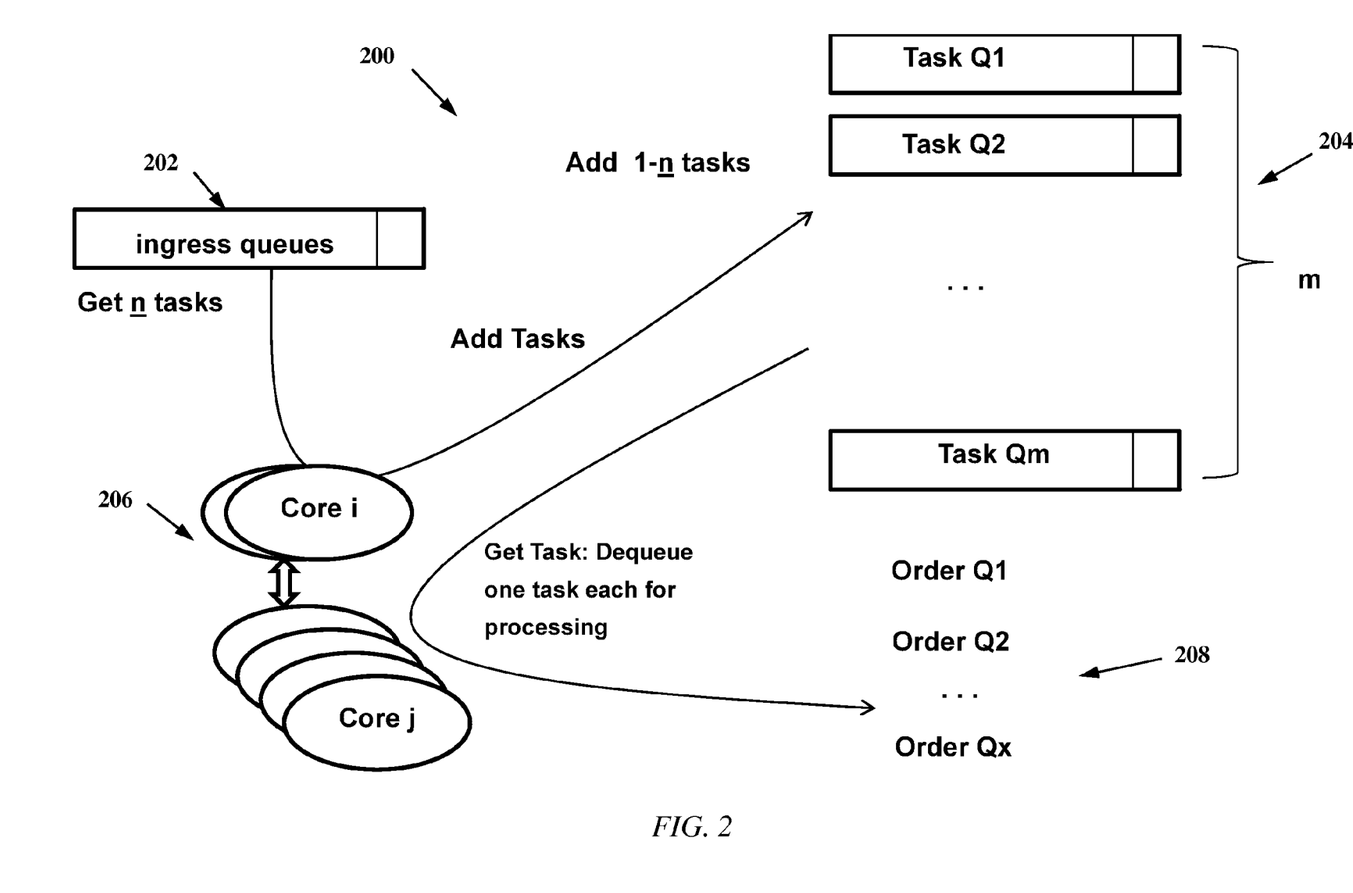
FIG. 2 is a schematic diagram illustrating a system for parallel processing in a multicore processor according to a disclosed embodiment.

FIG. 2 is a schematic diagram of a system 200 for parallel processing packets with a multi-core processor according to a disclosed embodiment. System 200 may be implemented by network unit 100 in FIG. 1. System 200 may comprise a plurality of ingress queues 202, a plurality of task queues 204, a plurality of cores 206, and a plurality of order queues 208. Multiple packets (e.g., 5/7 tuples) from the same path may arrive into the ingress queue 202 in the order that they are received. Multiple cores 206 may process the packets at the substantially the same time. However, these packets should be forwarded to the egress port in the same order in which they were received. The cores 206 may encapsulate the packets into tasks for scheduling. A group of cores 206 may poll tasks from the ingress port(s) and put each task into a different task queue 204 based on the task priority, task processing flow, and/or task order type. The order type may be Order/Null/etc. In an embodiment, task order may be kept for tasks with order type as 'Order'.

In contrast to many existing packet scheduling systems, a group of cores 206 may all poll tasks. To reduce the contention among cores, only one core 206 (e.g., core 'a' from the subset of cores "i") from the available cores 206 may lock the ingress queue 202 and actively poll tasks during a certain time. Other cores 206 (e.g., subset of cores "j") which cannot lock the ingress queue 202 due to its lock by core "a" 206 may transition to perform on one of the task queues 204. To reduce the lock cost (e.g., 300 CPU cycles), the Core "a" 206 may poll n number of tasks at each time. Thus the cost of lock for each task may be about time/n. Core "a" 206 may push each task polled in the ingress queue 202 into an individual TaskQ [1-m] in the task queues 204.

At substantially the same time that core "a" 206 is polling the tasks in the ingress queue 202, all other cores 206 (e.g., subset of cores "i" to cores "j" excluding core 'a') may poll tasks from any of the TaskQ[1-m] in the task queues 204 for task handling. However, if multiple cores 206 try to poll from one TaskQ at substantially the same time, high contention between the cores 206 may be created. Therefore, in an embodiment a pseudo-affinity between the cores 206 and the task queues 204 may be created. Thus, each core 206 may start from a different subset of the TaskQ, (e.g. core "1" from TaskQ[1-4], core "2" from TaskQ[5-8], etc.) based on the task queue priority, and may lock one of the task queues 204 for moving the task to the order queue 208. One difference between the disclosed pseudo-affinity and true affinity is that in pseudo-affinity, each of the task queues 204 may have multiple consumers (e.g. core 1 and core 2). Furthermore, if the default subset task queue 204 is locked, the core 206 may move to any other available task queue 204. Thus, core contention may still occur, but at much lower and controllable rate.

Each core 206 may move a task retrieved from the task queues 204 into the order queue 208. The order queue 208 may be a lockable or lockless queue. Each task in the order queue 208 may be handled within the order queue 208 (e.g., packet lookup, modification, forwarding, etc.). Tasks may exit from the order queue 208 when the task is at the head of the order queue 208.

Figure 3A:
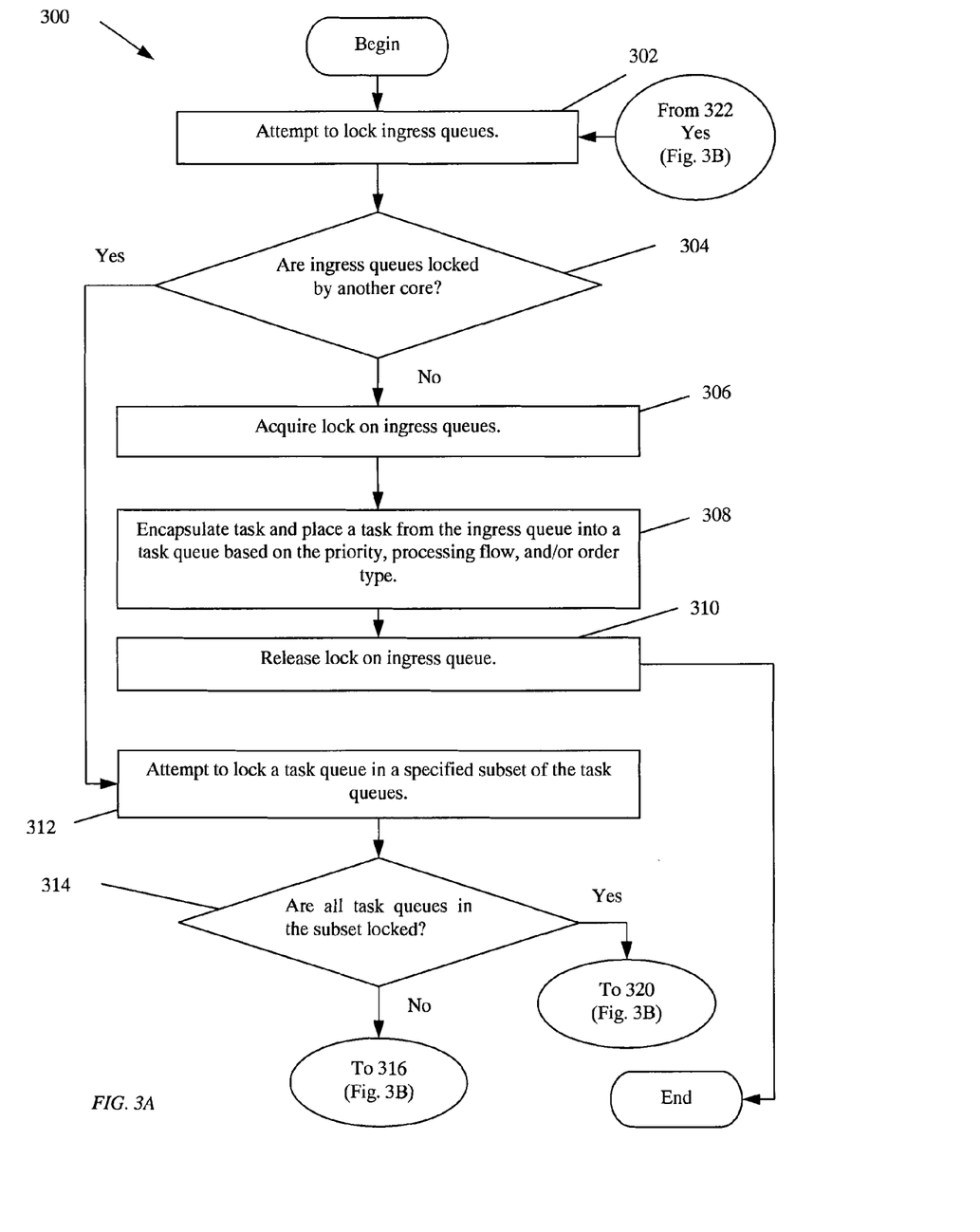
FIGS. 3A and 3B show a flowchart of a method for parallel processing in a multicore processor in accordance with a disclosed embodiment.
Figure 3B:
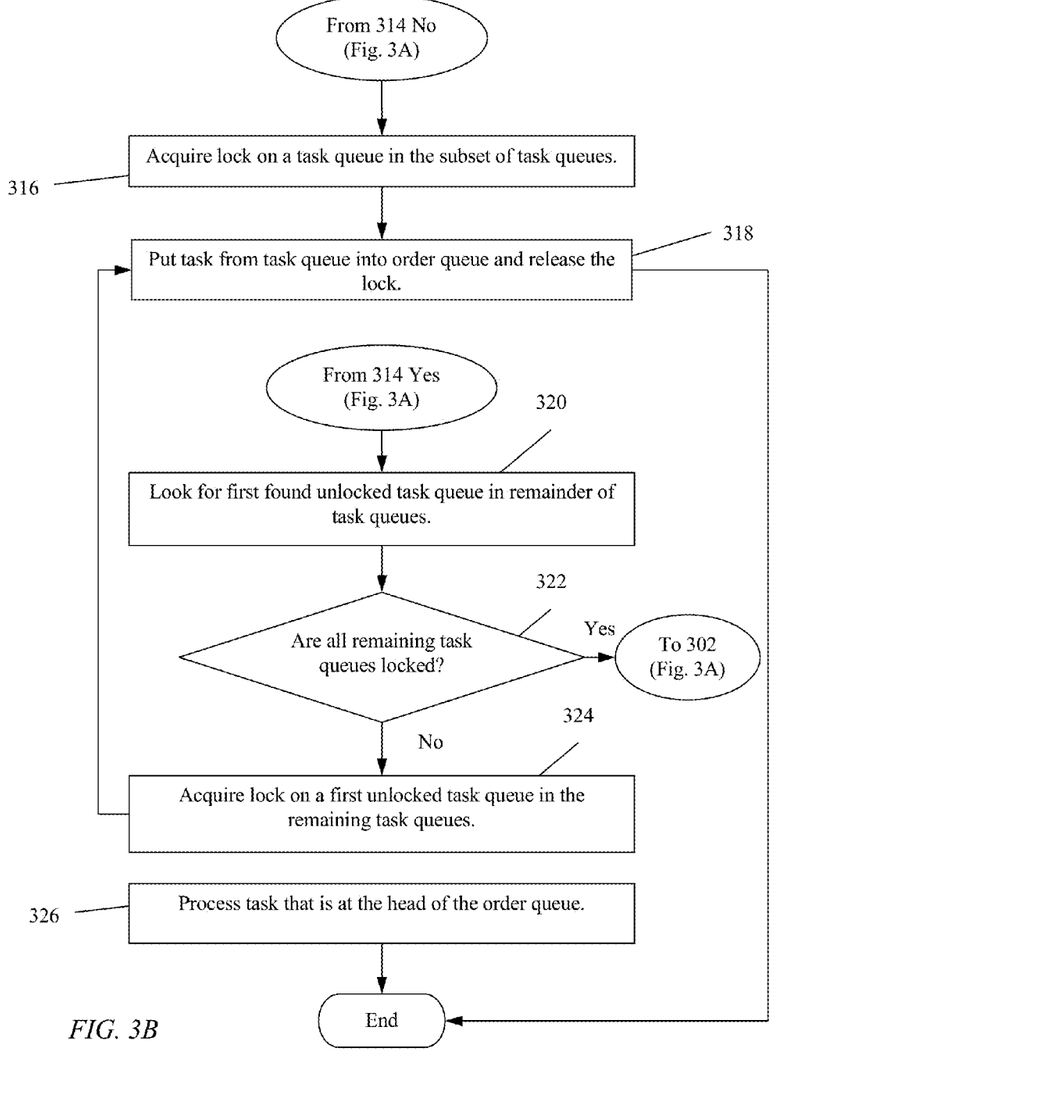

FIGS. 3A and 3B show a flowchart of a method 300 for parallel processing in a multicore processor in accordance with a disclosed embodiment. The method 300 may be implemented in network unit 100. The method 300 may begin at block 302 where a core in a multicore processor may attempt to lock the ingress queues. The ingress queues may comprise packets and the packets may comprise tasks. At block 304, the core may determine whether the ingress queues are locked by another core. If, at block 304, the queues are not locked by another core, the method 300 may proceed to block 306 where the core may acquire a lock on the ingress queues. At block 308, the core may encapsulate a task and place the task from the ingress queue into a task queue based on the priority, processing flow, and/or order type of the task. In an embodiment, the core may poll a specified number (n) of tasks at each time. The cost of the lock for each task may be the time during which the ingress queues are locked divided by the number of tasks, n (e.g., time/n). Limiting the number of tasks to a specified number may reduce the lock cost (e.g., time). The method 300 may proceed to block 310 where the core may release the lock on the ingress queue, after which, the method 300 may end.

If, at block 304, the ingress queues are locked by another core, the method 300 may proceed to block 312 where the core may attempt to lock a task queue in a specified subset of the task queues. At block 314, the core may determine whether any task queues in the subset of task queues are locked. If, at block 314, any of the task queues in the subset of task queues are not locked, the method 300 may proceed to block 316 where the core may acquire a lock on the first unlocked task queue it encounters in the subset of task queues. At block 318, the core may put the task from the task queue into the order queue and then release the lock on the task queue, after which, the method 300 may end.

If, at block 314, all of the task queues in the subset of task queues are locked, the method 300 may proceed to block 320 where the core may look for the first unlocked task queue in the remainder of the task queues. At block 322, the core may determine whether all remaining task queues are locked. If, at block 322, the core determines that all remaining task queues are locked, the method 300 may proceed to block 302.

If, at block 322, not all of the remaining task queues are locked, then the method 300 may proceed to block 324 where the core may acquire a lock on the first unlocked task queue encountered by the core from the remaining task queues. The method 300 may proceed to block 318 where the core may put the task from the task queue into the order queue, after which, the method 300 may end. At block 326, a core may process the task that is at the head of the order queue.

Figure 4:
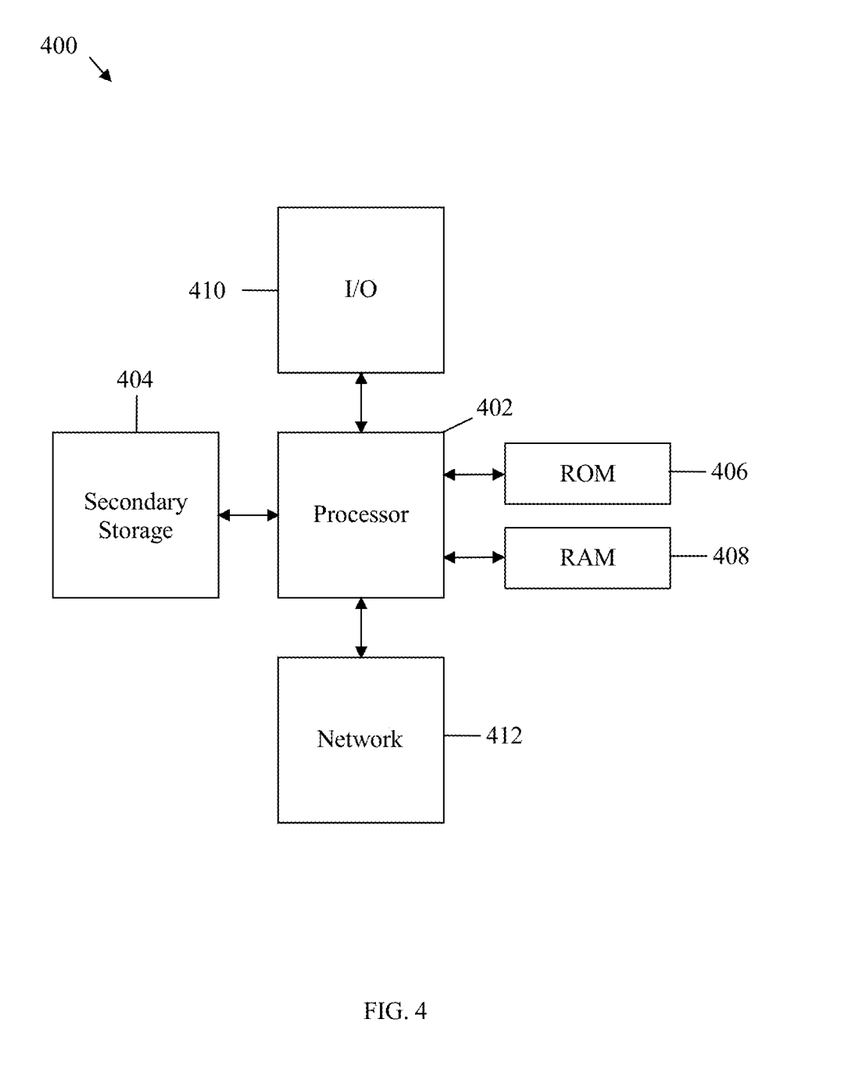
FIG. 4 illustrates a typical, general-purpose network component suitable for implementing one or more embodiments of the components disclosed herein.

Although described primarily with reference to switches and routers and other devices that route packets through a network, the methods, systems, and apparatuses of this disclosure are not limited to such devices, but may be implemented in any device with multiple processors and/or a processor with multiple cores. For example, FIG. 4 illustrates a typical, general-purpose network component 400 suitable for implementing one or more embodiments of the components disclosed herein. The network component 400 includes a processor 402 (which may be referred to as a CPU) that is in communication with memory devices including secondary storage 404, read only memory (ROM) 406, random access memory (RAM) 408, input/output (I/O) devices 410, and network connectivity devices 412. The processor 402 may comprise a plurality of processors and/or may comprise a processor with multiple cores such that the processor 402 may perform parallel computing. The network component 400 may comprise ingress queues, task queues, and an order queue such as ingress queues 126, task queues 127, and order queue 128 in FIG. 1. The ingress queues may comprise packets or any other data that may be delivered to or provided to the processor 402 for processing. The data to be processed may not be limited to data packets.

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for parallel processing implemented in a network unit, comprising:
   employing a first core to lock an ingress queue when the ingress queue is not locked by another core, encapsulate packets from the ingress queue into tasks for scheduling and push the tasks to one of a plurality of task queues based on one of a priority of the task, a processing flow of the task, or an order type of the task when the ingress queue is locked by the first core, and unlock the ingress queue after the pushing of the tasks;
   employing the first core to search a first subset of the plurality of task queues for a first unlocked task queue when the ingress queue is locked by another core, lock the first unlocked task queue and place a first task from the first unlocked task queue into an order queue when the first core finds the first unlocked task queue, and unlock the first unlocked task queue after placing the task;
   employing the first core to search a first remaining subset of the task queues for a second unlocked task queue when all of the first subset of the task queues are locked and the ingress queue is locked, lock the second unlocked task queue and place a second task from the second unlocked task queue into the order queue when the first core finds the second unlocked task queue, and unlock the first unlocked task queue after placing the second task, wherein the first remaining subset of the task queues comprises members of the task queues outside of the first subset of the task queues; and
   processing an order task that is at a head of the order queue.

2. The method of claim 1, further comprising polling with the first core a predetermined number of tasks from the ingress queue while the ingress queue is locked by the first core.

3. The method of claim 1, further comprising dynamically changing the task queues that are members of the first subset of the task queues when contention between cores for an unlocked task queue exceeds a threshold.

4. The method of claim 1, wherein the order queue is lockless.

5. The method of claim 1, wherein the order queue is lockable.

6. The method of claim 1, wherein the first subset of the task queues corresponds to a default subset of the task queues assigned to the first core.

7. The method of claim 1, further comprising:
   employing a second core to search a second subset of the task queues for a third unlocked task queue when the ingress queue is locked by another core, wherein the first subset of the task queues differs from the second subset of the task queues; and
   employing the second core to search a second remaining subset of the task queues for the third unlocked task queue when all of the second subset of the task queues are locked by other cores and the ingress queue is locked by another core, wherein the second remaining subset of the task queues comprises members of the task queues outside of the second subset of the task queues.

8. In a network unit, a computer program product executable by a multi-core processor, the computer program product comprising computer executable instructions stored on a non-transitory computer readable medium that when executed by the multi-core processor cause the network unit to perform the following:
   employing a first core to lock an ingress queue when the ingress queue is not locked by another core; encapsulate packets from the ingress queue into tasks for scheduling and push the tasks to one of a plurality of task queues based on one of a priority associated with the task; a processing flow associated with the task, or an order type associated with the task when the ingress queue is locked by the first core; and unlock the ingress queue after pushing of the tasks;
   employing the first core to search for a first unlocked task queue from a first default subset of a plurality of task queues when the ingress queue is locked by another core, lock the first unlocked task queue and place a first task from the first unlocked task queue into an order queue when the first core finds the first unlocked task queue, and unlock the first unlocked task queue after placing the first task, wherein the first default subset is different from a second default subset of the task queues from which a second core begins a search for a second unlocked task queue; and
   employing the first core to search a first remaining subset of the task queues for a second unlocked task queue when all of the first default subset of the task queues are locked by other cores and the ingress queue is locked by another core, lock the second unlocked task queue and place a second task from the second unlocked task queue into the order queue when the first core finds the second unlocked task queue, and unlock the first unlocked task queue after placing the second task, wherein the first remaining subset of the task queues comprises members of the task queues outside of the first default subset of the task queues; and
   processing an order task that is at a head of the order queue.

9. The computer program product of claim 8 further comprising instructions that cause the first core to poll a predetermined number of tasks from the ingress queue while the ingress queue is locked by the first core.

10. The computer program product of claim 8, wherein the order queue is lockless.

\* \* \* \* \*